Oct. 15, 1968
W. G. ATWATER
3,405,819
GUARD AGAINST OBSTRUCTING LOAD IN AN AUTOMATIC
WAREHOUSING SYSTEM
Filed Feb. 25, 1966
5 Sheets-Sheet 3
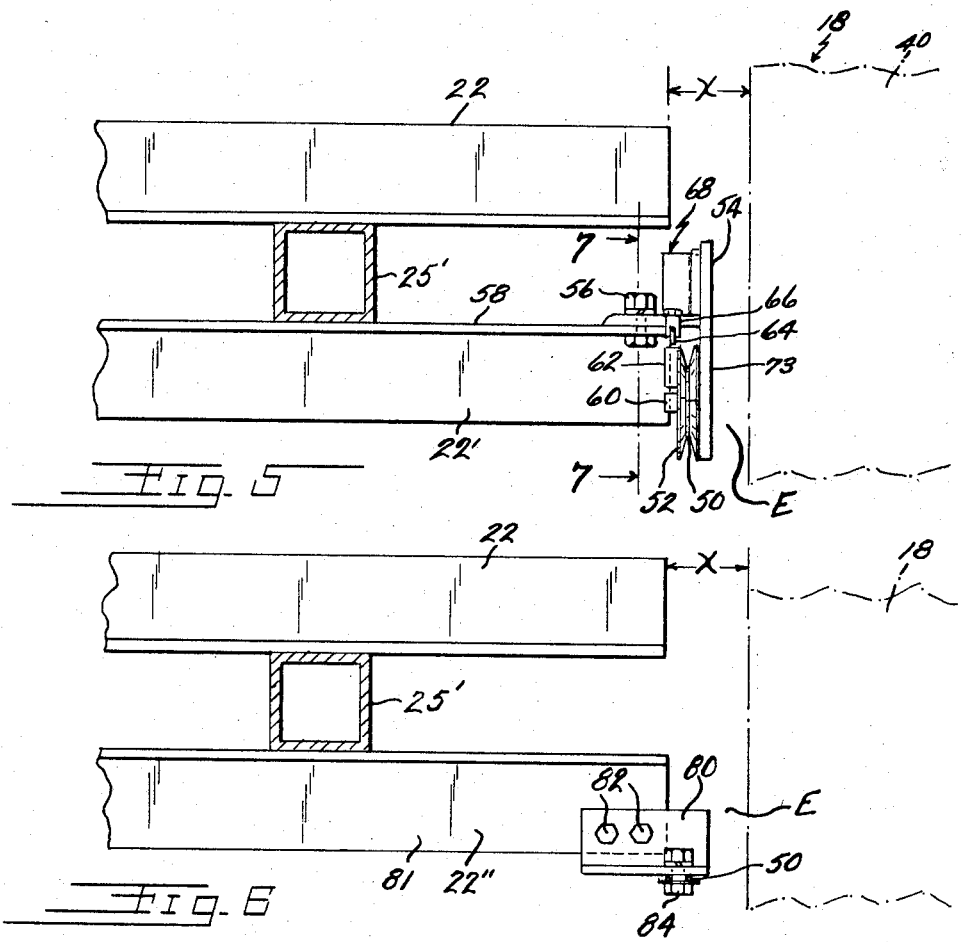
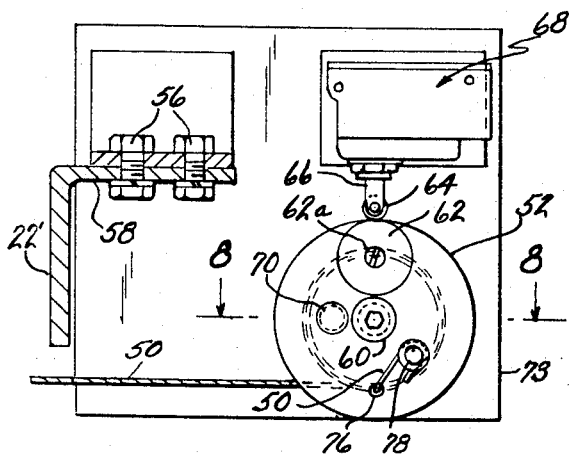
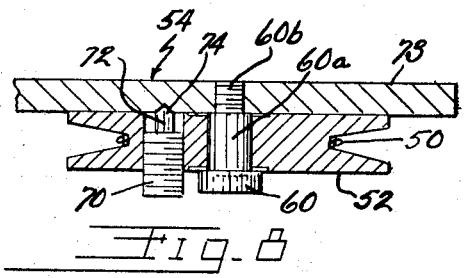
INVENTOR
WAYNE G. ATWATER
BY
Baldwin, Doran & Egan
ATTORNEYS

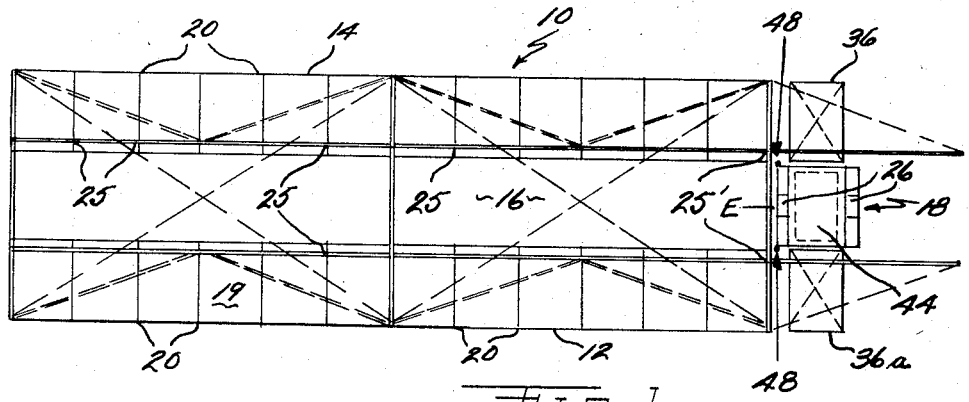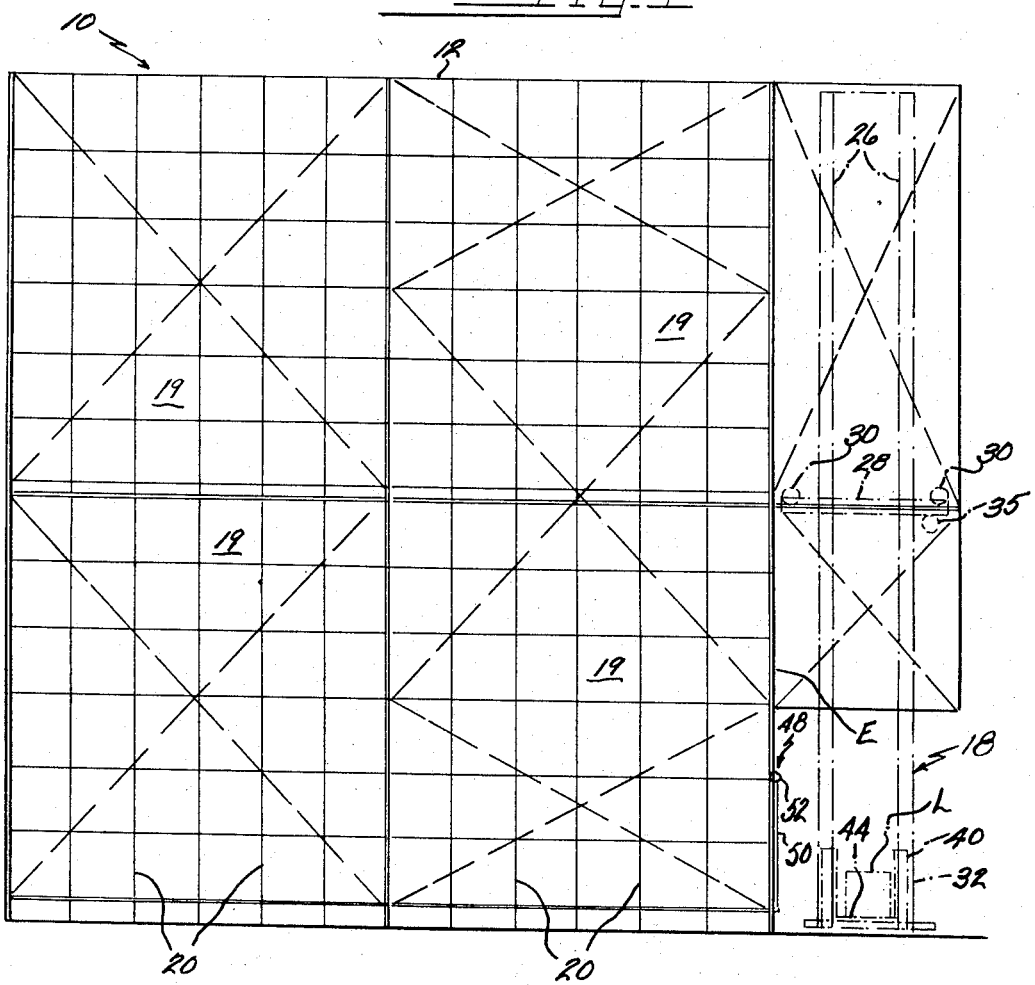

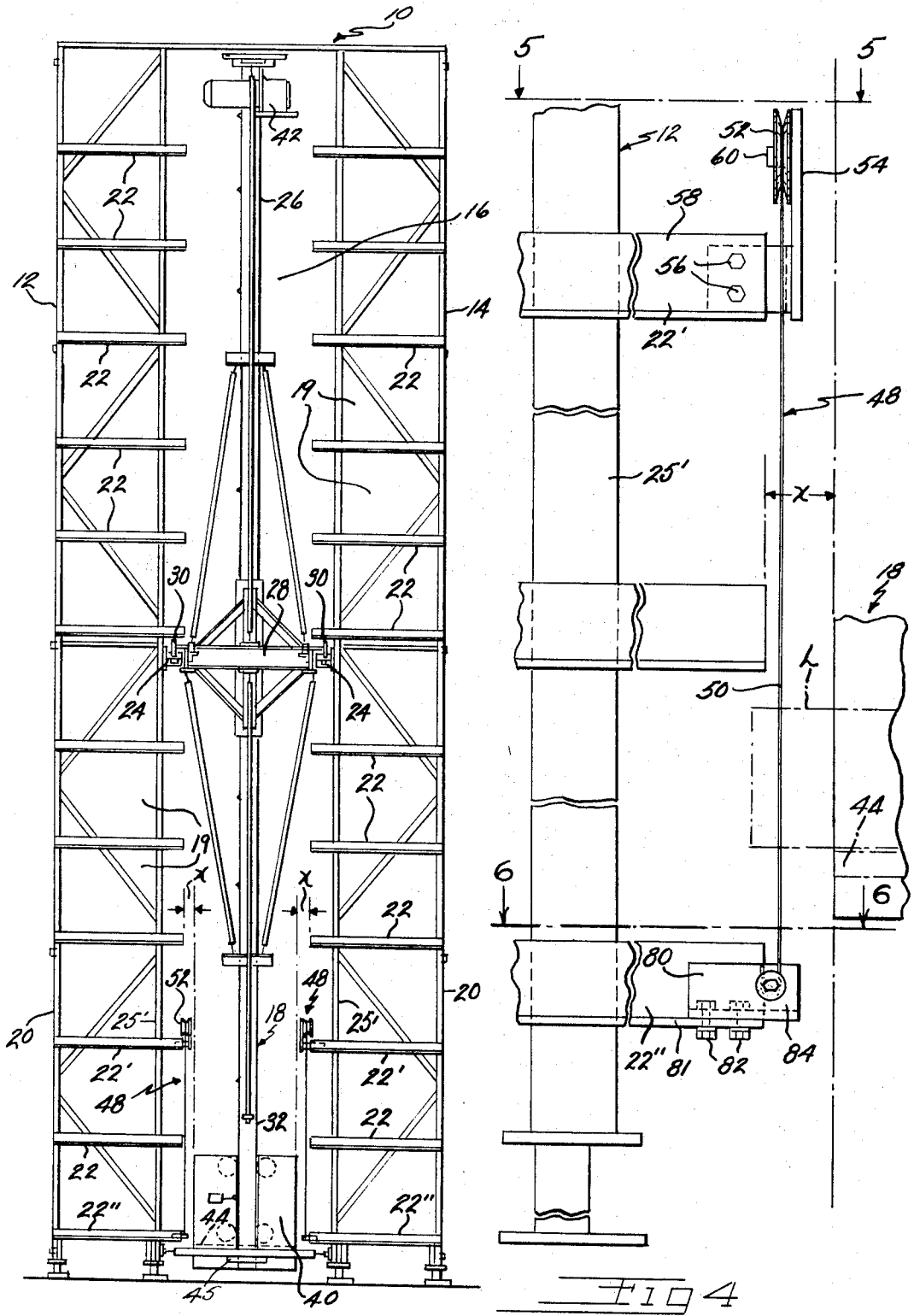

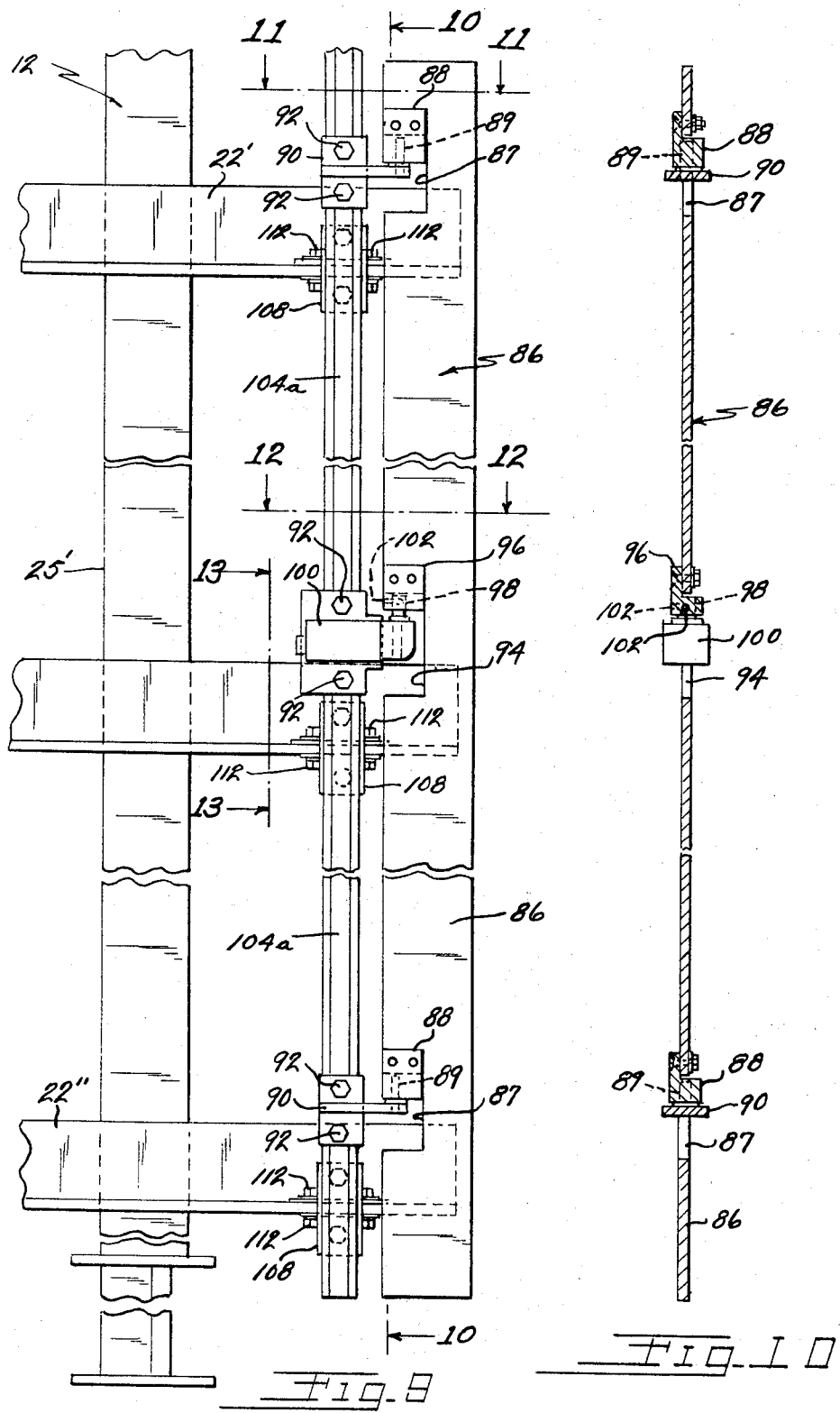

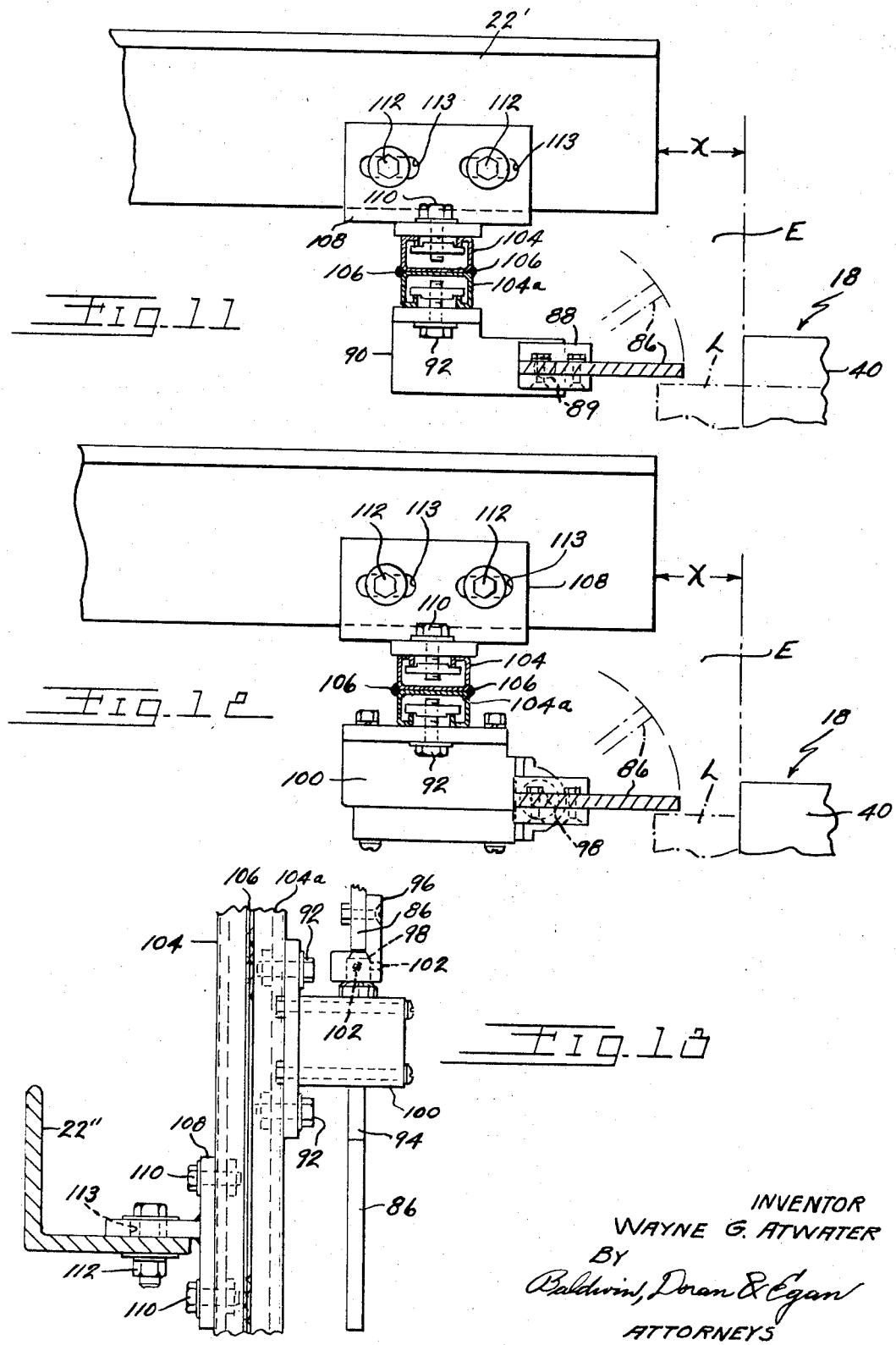

10

United States Patent Office 3,405,819
Patented Oct. 15, 1968

3,405,819
GUARD AGAINST OBSTRUCTING LOAD IN AN AUTOMATIC WAREHOUSING SYSTEM
Wayne G. Atwater, Willoughby, Ohio, assignor to
The Triax Company, Cleveland, Ohio, a corporation of Ohio
Filed Feb. 25, 1966, Ser. No. 530,012
9 Claims. (Cl. 214—16.4)

ABSTRACT OF THE DISCLOSURE

A guard against an obstructing load in an automatic warehousing system wherein a powered load carrier is movable from a pick-up and discharge station through an entranceway into a travel zone running alongside a storage frame, with the load carrier being adapted to place loads into the storage frame and to remove loads therefrom. The guard comprises a load detecting mechanism for sensing a load projecting laterally from the load carrier as the carrier moves from the pick-up and discharge station toward the travel zone, with the detecting mechanism comprising elongated generally vertically oriented movable means disposed ahead of the entranceway in general alignment with the running clearance between the load carrier and the respective storage frame section, and control means, such as a switch, operatively coupled to the movable means and to the motor means for driving the load carrier, for de-energizing the load carrier upon predetermined movement of the movable means as occasioned by a load projecting laterally of the load carrier.

---

This invention relates in general to automatic warehousing systems and the like, and more particularly to safety apparatus for detecting skewed or otherwise disarranged loads, or oversized loads, and preventing them from entering into the storage area of the system.

A typical warehousing system of the type to which the present invention may be applied but by no means the only such system is disclosed in assignee's copending U.S. patent application Ser. No. 373,803, filed June 9, 1964, and now abandoned, under the name of Anthony R. Chasar, and entitled, Automatic Warehousing System.

The above referred to warehousing system of application Ser. No. 373,803 comprises a storage frame having vertically and horizontally arranged load support means opening at vertical workfaces disposed on either side of an intermediate aisle or travel zone. An automatically controlled mechanized load carrier is movable along the aisle or travel zone and has an elevator for transporting a load to different levels in the storage frame. A pick-up and discharge station is provided at one end of the aisle beyond or ahead of the storage frame, and at such pick-up and discharge station, a load is initially picked up by the load carrier for transparting it into the travel zone or aisle and then into the storage frame.

The present invention relates to means disposed generally adjacent to or ahead of the entranceway to the travel zone alongside of the storage frame, for detecting or sensing a skewed or otherwise out of position load, or an oversized load, on the load carrier, which could collide with the storage frame upon entering of the load carrier into the travel zone or aisle.

Accordingly an object of the invention is to provide a novel detecting means which is operative to sense an out of position load or an oversized load on a load carrier in a warehousing system, prior to entry of the load on the load carrier into the storage area.

Another object of the invention is to provide novel detecting means for use with an automatic warehousing system which includes storage means and a powered load carrier movable in a travel zone alongside of said storage means for inserting a load into or removing a load from the storage means, and wherein such detecting means is arranged to detect an improperly positioned load, or an oversized load, on the load carrier prior to movement of the load on the load carrier into the travel zone.

A further object of the invention is to provide a detecting device of the latter mentioned type which includes means for preventing any further movement of the load carrier when the detecting means senses an out of position load, or an oversized load, on the load carrier.

A further object of the invention is to provide a detecting device of the above mentioned type wherein such detecting device comprises a flexible element positioned at the entranceway to the travel zone alongside of the storage means, and where such flexible element is operatively coupled to control means which control means is operative upon actuation thereof to deenergize power means driving the load carrier, and stop all further movement thereof.

A still further object of the invention is to provide a detecting means of the above mentioned type which includes a swingable gate-like member positioned generally adjacent to or ahead of the entranceway to the travel zone alongside of the storage means, and which is operatively coupled to a control means that controls the energization of the power means driving the load carrier, so that if an improperly positioned load, or an oversized load, on the load carrier strikes the detecting means as the load carrier moves toward the travel zone alongside of the storage means, the control means will be actuated so as to deenergize the power means of the load carrier, and stop all further movement of the load carrier, thereby preventing damage to the load carrier, and/or to the load, and/or to the storage means.

A still further object of the invention is to provide a detecting means of the above mentioned type which is readily assembled with the storage means, and which can be readily removed therefrom for replacmnt and/or repair thereof.

Other objects and advantages of the invention will be apparent from the following description taken in conjunction with accompanying drawings wherein:

FIG. 1 is a diagrammatic top plan view of an automatic warehousing system embodying the instant invention.

FIG. 2 is a diagrammatic side elevational view of the automatic warehousing system of FIG. 1.

FIG. 3 is an enlarged end elevational view of the warehousing system of FIGS. 1 and 2, and illustrating one embodiment of the detecting means mounted thereon, for detecting an improperly positioned load or an oversized load on the load carrier, prior to movement of the load on the load carrier into the travel zone aisle of the storage frame.

FIG. 4 is an enlarged, fragmentary, partially broken, elevational view of a portion of the detecting means illustrated in FIG. 3, and more particularly the left hand side of the FIG. 3 detecting means.

FIG. 5 is a fragmentary sectional, plan view of a portion of the detecting means illustrated in FIG. 4, taken generally along the plane of line 5—5 thereof.

FIG. 6 is a fragmentary, sectional plan view of a portion of the detecting means shown in FIG. 4, taken generally along the plane of line 6—6 thereof.

FIG. 7 is an enlarged sectional view taken generally along the plane of line 7—7 of FIG. 5 looking in the direction of the arrows.

FIG. 8 is an enlarged sectional view taken along the plane of line 8—8 of FIG. 7.

FIG. 9 is an enlarged, fragmentary, end elevational view generally similar to that illustrated in FIG. 4, but showing a modified form of detecting means associated with the storage frame of the warehousing system, and wherein such modified form comprises a swingable gate-like mechanism.

FIG. 10 is a sectional view taken generally along the plane of line 10—10 of FIG. 9 looking in the direction of the arrows.

FIG. 11 is a fragmentary sectional view taken generally along the plane of line 11—11 of FIG. 9 looking in the direction of the arrows.

FIG. 12 is a fragmentary sectional view taken generally along the plane of line 12—12 of FIG. 9 looking in the direction of the arrows.

FIG. 13 is a fragmentary sectional view taken generally along the plane of line 13—13 of FIG. 9, looking in the direction of the arrows.

Referring now again to the drawings, and in particular to FIGS. 1 to 8 thereof, the automatic warehousing system, in the embodiment illustrated, may comprise a storage frame 10 having generally parallel storage frame sections 12 and 14, defining between them a travel zone or aisle 16, so as to permit a motorized load carrier, indicated generally at 18, to be moved along the aisle or travel zone 16, and to insert and/or withdraw a load or article from the storage bins 19 formed by storage sections 12 and 14.

As shown, each storage section may be constructed of a plurality of vertically extending posts 20, 25 spaced apart by a pluarlity of generally horizontally extending load supporting rails or members 22, defining a plurality of the storage bins 19. As aforementioned, the instant arrangement of warehousing system may be generally similar to that disclosed in the copending U.S. patent application Ser. No. 373,803, and reference may be had thereto for a more detailed description of such storage bin arrangement.

As can be seen in FIG. 3, the aisle sides of the storage sections 12 and 14 may be provided with a pair of generally horizontally extending rails 24 defining tracks providing for supporting the load carrier 18 as it is moved therealong within the aisle or travel zone 16 with there being provided a relatively small running clearance $x$ (FIGS. 3 and 4) between the sides of the load carrier and the storage sections during movement of the load carrier in said travel zone.

The load carrier 18 may comprise an upright mast structure formed with a pair of generally vertically extending track members 26 (FIGS. 2 and 3) with the mast structure being secured to an intermediate carriage frame 28. Carriage frame 28 bridges the distance across the aisle 16, and may have wheels 30 at the sides thereof, which are disposed in rolling engagement in the tracks 24, thus supporting the load carrier 18 on the tracks 24 for horizontal movement. Such horizontally movable structure of the load carrier will be hereinafter referred to as conveyor mechanism or means 32. Suitable power means 35 (FIG. 2) such as an electric motor, operably coupled to wheels 30, may be provided for causing horizontal movement of the conveyor means 32.

Rails 24 extend outwardly of the aisle 16 at the front end thereof, to enable the load carrier to be located completely in front of the storage bays 12 and 14 at a pick-up and discharge station 36, 36a (FIG. 1) from which position the load carrier starts its movement into the aisle or travel zone to deposit or pick up loads in the storage frame sections. Such pick-up and discharge station may be located on both sides or on only one side of the load carrier and at any suitable height relative to the storage frame. The present embodiment of the invention as illustrated comprises two pick-up and discharge stations. Reference may be had to the aforementioned U.S. application Ser. No. 373,803 for a more detailed disclosure of the construction of a suitable pick-up and discharge station.

The load carrier 18 may comprise a vertically movable elevator 40 which is adapted for movement along the vertical tracks 26 of the mast structure of the conveyor means, to the full height of the storage frame. Suitable power means, such as electric motor 42 (FIG. 3) may be carried by the mast structure of the horizontally movable conveyor means 32, with such motor being operatively coupled to the elevator 40 in a known manner for actuataing the elevator in its vertical movement. The elevator 40 may include load supporting platform or extractor 44 (FIG. 3) which preferably provides an extensible table, such table being extendable in either of the opposed directions transverse to the direction of movement of the load carrier 18 in its traveling zone, so as to locate the extractor within either of the storage sections 12 or 14, effective to place the extensible table in position to deposit or remove a load from a selected one of the storage bins 19. Suitable power means such as an electric motor 45 may be mounted on the elevator 40 and operatively coupled to the extractor 44 for actuating the latter. Reference may be had to the aforementioned copending U.S. application Ser. No. 373,803 for a more detailed disclosure of such extensible extractor.

Now in accordance with present invention there is provided generally adjacent to the entranceway E to the aisle or travel zone of the storage sections 12 and 14, a detecting device 48 which is operative to detect an improperly positioned load, or an oversized load, on the load carrier before it moves the load into the aisle for depositing the load into a selected one of the storage bins. Referring now to FIGS. 3 to 8 inclusive, such detecting device 48 may comprise an elongated, generally flexible sensing member 50, such as a steel cable, one of which may be mounted, in the embodiment illustrated, on each side of the entranceway to the travel zone 16 between the storage sections 12 and 14.

Each such elongated flexible member 50 is preferably mounted in generally taut condition, ahead of the associated front aisle post 25', and in the embodiment illustrated is secured to the aisle end of the outer horizontally extending rail member 22' at the third load supporting level in the respective storage section. The upper end of the cable 50 may be secured to a rotatable member such as pulley 52, rotatably mounted on a bracket member 54, which in turn may be preferably detachably secured as by means of bolt and nut assemblies 56, to the upstanding flange 58 of outer rail member 22' adjacent its outer end. As can be best seen in FIG. 5, the bracket 54 positions the pulley 52 and cable 50 forwardly of the entranceway E to the travel zone between the storage frame sections.

The pulley 52 may be rotatably mounted upon a shouldered nut 60 having a smooth shank portion 60a for receiving the pulley wheel in rotatable relation, with the nut 60 being suitably fastened to the bracket 54 as by means of threaded portion 60b. The outer side of the pulley wheel carries a circular (in the embodiment illustrated) cam 62, the axis of which is radially displaced from the axis of rotation of the pulley wheel. The cam 62 may be secured to the pulley by means of a bolt 62a, and is adapted to travel in an arc around the axis of rotation of the pulley whenever the pulley wheel is rotated. In its normal position, the cam 62 is disposed substantially exactly opposite to roller 64 of the spring loaded, plunger type limit switch actuator 66, and when in such position, contacts the roller and cams the actuator 66 inwardly.

When the actuator 66 is in the position illustrated in FIG. 7, the contacts of the conventional plunger type limit switch 68 are held in a position to permit the load carrier 18 to operate normally, and in other words to move in the travel zone between the storage sections. Rotation of the cam 62 around the axis of rotation of the pulley during rotation of the pulley, and away from the roller 64 permits the spring loaded actuator 66 to move outwardly, whereby the limit switch contacts move to cut off position, thereby stopping all movement of the load carrier. In this connection, the movement of the conveyor frame 32, and the movement of the elevator 40 and extractor 44 thereof, as actuated by the power means 35, 42 and 45, are all preferably automatically actuated in a predetermined series of simultaneous or sequential movements, to store a load, and as by means of an automatic control system of the type disclosed in the copending U.S. patent application of Sanford Saul, filed Dec. 14, 1964, under Ser. No. 418,048, and entitled Electrical Control Circuit for an Automatic Warehousing System. The limit switches 68 may be connected into such a control circuit in conventional manner, well known to those skilled in the electrical control art, to break the circuit in a main power load or isolate a master control relay, to cut off the power to motor units 35, 42 and 45, and thus stop all movement of the load carrier.

A detent mechanism 70 may be mounted on the pulley wheel so as to releasably hold the pulley wheel in the position illustrated in FIG. 7. Such detent mechanism may comprise a threaded cartridge threaded into an aperture extending through the pulley, and carrying a spring biased detent 72. The detent 72 is directed toward the flange 73 of bracket 54, and said flange may be provided with a relatively shallow recess 74, adapted to receive the distal end of the detent 72. The recess 74 is so positioned that the detent is seated therein when the pulley and cam are in the position shown in FIG. 7, and such detent and recess create sufficient resistance to the turning of the pulley wheel, so that any tendency of the cam to independently roll away from the roller 64 of the limit switch 68 is prevented. In this position, the flexible member or cable 50 is pulled generally tautly, with the upper end thereof being looped about the pulley, preferably two or three times, and then projecting through an aperture 76 in the outer side of the pulley to be secured to the pulley, as by means of headed screw 78.

The lower end of each sensing member 50 may be coupled to the lower outer rail member 22″ at the first load supporting level in the respective storage section, as by means of an L-shaped bracket member 80 which may be suitably detachably coupled to the horizontal flange 81 of rail member 22″ by means of bolt and nut assemblies 82. Such lower end of the sensing member 50 may be looped about a threaded bolt and nut assembly 84 for securement to bracket 80.

It will be seen that if an improperly positioned or an oversized load (e.g. L—FIG. 4) on the load carrier 18 is extending out beyond a side or the sides of the load carrier and into the runing clearance on either or both sides of the load carrier as the load carrier commences its movement into the entranceway of the aisle or travel zone of the warehousing system, such improperly positioned load if it strikes the generally taut sensing cable on the associated side of the entranceway, will cause the cable to be deflected or moved, thereby causing rotation of the pulley wheel 52 against the resistance of the spring loaded detent 72, and permitting the actuator 66 of the limit switch 68 to move outwardly. Outward movement of the actuator 66 actuates the switch contacts to cut off the power to the load carrier motors, and stops any further movement of the load carrier as previously described. Thus, damage to the load, and/or to the load carrier and/or to the storage frame is prevented. Such cable means 50 also provides a convenient arrangement for an operator to pull on either cable 50 and stop movement of the load carrier.

Referring now to FIGS. 9 to 13, there is shown a modified form of detecting device for use in sensing an improperly positioned or oversized load on the load carrier and stopping movement thereof into the travel zone alongside the storage frame. In this embodiment, the sensing means comprises a swingable gate-like member 86 which may be formed of any suitable material, and preferably a relatively light weight material, such as for instance aluminum, thin spring steel, or fiberglass. One of the gate-like members 86 may be mounted adjacent each side of the entranceway E similarly to the first described embodiment of detecting device. Each such gate-like member may be provided with spaced recesses 87 in its outer edge portion, and socket members 88 of generally L-shaped configuration in side elevation (FIG. 10) may be mounted in secured relation in such recessed portions 87, adapted to receive a respective hinge pin 89 which may be secured to a bracket 90 preferably detachably fastened as at 92 and at for instance the third and first levels of outer rails 22′, 22″ respectively. Socket members 88 may be formed of an anti-friction material, such as for instance the known plastic Teflon, for facilitating relative movement between the socket members 88 and their respective hinge pins 89, during swinging movement of gate-like member 86.

An intermediate recess 94 may also be provided, with a socket member 96 of L-shaped configuration disposed therein in fixed relation to gate 86. Member 96 may be formed of a hard material, such as steel, since there is no relative movement between it and the spring loaded lever type actuator 98 of conventional lever type-spring return limit switch 100. Actuator 98 is received in socket member 96 and is operatively coupled thereto so that upon swinging movement of gate 86, the actuator is rotated to actuate the switch and thus cut off power to the load carrier 18. Set screws 102 may be provided extending through the socket member 96 and into locking engagement with the actuator 98, to prevent relative rotary movement between the actuator and the socket member 98. Switch 100 may be mounted on bracket 101 secured to the respective storage frame section by fasteners 92. When the improperly positioned or oversized load is corrected so as not to engage the gate member 86, the spring return of the limit switch 100 automatically moves the gate back to normal position (i.e the position shown in full lines in FIGS. 11 and 12) whereby the load carrier may be reactivated for entry into the storage area.

As can be best seen in FIGS. 11, 12 and 13, the gate 86 may be mounted to the respective storage frame section by means of back-to-back generally U-shape channels 104, 104a, secured together as by means of welds 106 and adjustably attached to T-shaped brackets 108 as by means of bolt and nut assemblies 110, with such brackets 108 being in turn adjustably secured to the horizontally disposed flange of the respective outer rail as by means of bolt and nut assemblies 112. In this connection, brackets 108 may be provided with elongated slots 113 to facilitate adjustment of the gate 86 transversely of the respective storage frame section. Bolt and nut assemblies 110 provides for ready adjustment of the gate member in directions vertically of the respective storage frame section.

As best illustrated in FIGS. 11 and 12, the gate-like member 86 extends laterally inwardly of the running clearance $x$ slightly beyond the inner load receiving ends of the load supporting rails of the storage sections. When either one or both of the gate members 86 is contacted by an improperly positioned or over-sized load on the carrier as it commences its movement into the entranceway E of the aisle, such gate member is caused to swing as shown in phantom lines in FIGS. 11 and 12, thereby rotating the actuator 98 of the limit switch 100 and causing deenergization of the power means driving the load carrier, thereby stopping further movement of the load carrier.

Running clearance $x$ as used in the aforegoing specification and hereinafter set forth in the claims will be understood to mean the clearance provided in the warehousing system between the plane of the aisle side of the storage frame and the confronting side of the load carrier-elevator-extractor mechanism 18. The running clearance does not include the sensing means 50 or 86 and their supporting structure, which are deformable and/or expendable if struck by an object.

From the foregoing description and accompanying drawings it will be seen that the invention provides a novel warehousing system which includes a detecting device comprising sensing means which is disposed ahead of or adjacent to the entranceway to the travel zone of the load carrier, for detecting an improperly positioned load, or an oversized load, on the load carrier, and with such sensing means having control means coupled thereto for deenergizing the power means driving the load carrier when an improperly positioned or oversized load engages said sensing means. The invention also provides a detecting device which can be readily installed on existing automatic warehousing systems, and a device which is readily removable for replacement or repair thereof.

What is claimed is:

1. In an automatic warehousing system comprising generally parallel-extending laterally-spaced storage sections defining a travel zone between said storage sections, each of said storage sections comprising a framework defining a plurality of vertically and horizontally arranged storage bins having open load receiving ends facing said travel zone, said travel zone having an entranceway, at least one pick-up and discharge station disposed ahead of said entranceway, a powered load carrier movable from said pick-up and discharge station through said entranceway into said travel zone for depositing a load received from said pick-up and discharge station into a selected one of said storage bins or removing a load from a selected one of said storage bins and returning it to said pick-up and discharge station, said load carrier comprising a generally horizontally movable conveyor portion having generally vertically extending mast structure thereon, a vertically movable elevator portion mounted on said mast structure for vertical movement with respect thereto and adapted to be positioned adjacent the selected bin level, and a laterally movable extractor portion mounted on said elevator portion for movement into and out of said storage bins for depositing loads into and removing loads from the selected of said storage bins, power means for driving said conveyor, elevator and extractor poritions, the combination therewith of load detecting mechanism operatively coupled to said storage sections for sensing a load projecting laterally from said load carrier as the latter moves from said pick-up and discharge station toward said travel zone, said detecting mechanism comprising elongated laterally spaced movable means disposed ahead of said entranceway on opposite sides of the latter, each of said movable means extending generally vertically in general alignment with the running clearance between said load carrier and the respective storage section, and control means operatively coupled to said movable means for deenergizing said powered load carrier upon predetermined movement of at least one of said movable means, each of said movable means commencing generally adjacent the bottom of said entranceway and extending generally vertically a distance materially less than the height of said entranceway.

2. A warehousing system in accordance with claim 1 wherein said movable means comprises an elongated generally flexible element disposed in generally taut condition, said control means including a limit switch operatively coupled to said flexible element and to said power means for driving said powered load carrier for de-energizing said power means upon deflection of said flexible element.

3. A warehousing system in accordance with claim 2 wherein said detecting mechanism includes a rotatable member supported by said storage framework, said flexible element being coupled adjacent one end thereof to said rotatable member and at the other end thereof being coupled to said storage framework, means coacting with said rotatable member for releasably resisting rotation thereof, said flexible element upon said deflection thereof being adapted to cause rotation of said rotatable member against the resistance of the last mentioned means and to cause actuation of said switch.

4. A warehousing system in accordance with claim 3 wherein said switch includes a spring loaded plunger type actuator, means on said rotatable member normally engaging said actuator and maintaining it in retracted condition, said means on said rotatable member being adapted to disengage from said actuator to permit movement of said actuator to extended condition upon predetermined rotation of said rotatable member, whereupon said switch is actuated to de-energize said load carrier.

5. A warehousing system in accordance with claim 3 wherein said means releasably resisting rotation of said rotatable member comprises a resilient detent, means supporting said rotatable member thereon and having a recess therein, said detent being mounted on said rotatable member in confronting relation to said recess and in engagement therewith to resist rotation of said rotatable member.

6. A warehousing system in accordance with claim 1 wherein each of said storage sections comprises a tiered arrangement of storage bins, said bins being more than three tiers high, said movable means extending generally vertically from the first to the third tier commencing from the bottom tier.

7. A warehousing system in accordance with claim 1 wherein each of said elongated movable means comprises a gate-like member extending generally vertically and projecting laterally into the plane of the running clearance between said load carrier and the respective storage section, support means for said gate-like member including an elongated generally vertically extending support, vertically spaced hinge means mounted on said support and mounting said gate-like member for horizontal swinging movement about a generally vertical axis, means for selectively adjusting the vertical positions of said hinge means with respect to said support thus providing for the vertical adjustment of said gate-like member with respect to said support and with respect to the respective storage section, means mounting said support in said generally vertically oriented position, the last mentioned means including means for adjustably changing the vertical position of said support with respect to the respective storage section and for adjustably changing the lateral position of said support with respect to said entranceway, thereby providing for both vertical and lateral adjustment of said gate-like member with respect to said entranceway, said control means including a limit switch operatively coupled to said gate-like member and to said power means for driving said load carrier, for de-energizing said power means upon predetermined swinging of said gate-like member.

8. A warehousing system in accordance with claim 1 wherein each of said movable means extends generally vertically a distance less than one-half the height of said entranceway.

9. In an automatic warehousing system comprising a storage frame having a plurality of vertically and horizontally oriented storage bins therein with said bins having open load receiving ends, and there being a travel zone alongside of said storage frame, said travel zone having an entranceway, and a powered load carrier movable from a position ahead of said entranceway into said travel zone for depositing a load into or removing a load from a selected bin in the storage frame, said load carrier comprising a generally horizontally movable conveyor portion having generally vertically oriented mast structure thereon, an elevator portion mounted on said mast structure for vertical movement with respect thereto, an extractor portion mounted on said elevator portion and adapted for lateral movement into and out of a selected bin for depositing a load into or removing a load from the selected bin, power means for driving said load carrier, the combination therewith of a detecting device disposed adjacent to and forwardly of said entranceway to said travel zone and being adapted to sense a load projecting laterally from said load carrier as the load carrier moves to the entranceway of said travel zone, said dectecting device comprising an elongated movable gate extending generally vertically and projecting laterally into the plane of the running clearance between said load carrier and said storage frame, said gate being swingable about a generally vertical axis, control means operatively coupled to said swingable gate and to said power means for deenergizing said load carrier upon predetermined swinging movement of said gate, and means supporting said gate on said storage frame and positioning said gate in general alignment with said running clearance, the last-mentioned means including elongated inner and outer channel-like members disposed in back-to-back attached relationship, bracket means spaced vertically along said inner channel member and projecting rearwardly therefrom, means adjustably securing said attached channel members to said bracket means for vertical adjustment of said attached channel members with respect to said bracket means, said bracket means having elongated slots therein extending in a direction transverse to the direction of movement of said conveyor portion of said load carrier in said travel zone, fastener means extending through said slots in said bracket means and into coaction with said storage frame for mounting said attached channel members in generally vertical relation on said storage frame, said elongated slots providing for lateral adjustment of said channel members with respect to said entranceway, vertically spaced hinge means supported by the outer one of said channel members, and means adjustably mounting said hinge means on said outer channel member for vertical adjustment with respect thereto, thus providing for adjustment of the vertical position of each of said hinge means with respect to said outer channel member, each of said hinge means comprising an upstanding pin, and socket means attached to said gate and receiving therein the respective of said pins in relatively rotatable relation, said control means including a limit switch mounted on said outer channel member, said limit switch including a lever-type actuator having an external stem, a socket member secured to said gate and receiving said stem therein, and means detachably securing said stem to said socket member for movement as a unit during swinging of said gate, said actuator being spring loaded for automatic return to inactive position upon removal of a force causing swinging of said gate from its starting position, said gate being comprised of relatively light weight material, such as aluminum, whereby said gate is automatically returned to its starting position by said actuator upon removal of said force.

References Cited

UNITED STATES PATENTS

| | | | |
|---|---|---|---|
| 922,607 | 5/1909 | Martineau | 187—40 |
| 1,090,918 | 3/1914 | King et al. | 187—40 |
| 1,436,137 | 11/1922 | Aldred | 187—40 |
| 1,486,027 | 3/1924 | Mayotte | 187—40 |
| 1,564,668 | 12/1925 | Hageman | 16—171 |
| 1,619,890 | 3/1927 | Silberman | 16—171 |
| 1,936,828 | 11/1933 | Clement et al. | |
| 2,430,935 | 11/1947 | Klug. | |
| 2,781,542 | 2/1957 | West | 16—151 |
| 3,014,488 | 12/1961 | Seaman | 200—61.41 |
| 3,323,661 | 6/1967 | Chasai | 214—164 |

GERALD M. FORLENZA, *Primary Examiner.*

R. B. JOHNSON, *Assistant Examiner.*